(12) United States Patent
Liu

(10) Patent No.: US 12,277,924 B2
(45) Date of Patent: Apr. 15, 2025

(54) TEXT TO SPEECH PROCESSING METHOD, TERMINAL, AND SERVER

(71) Applicant: Huawei Technologies Co., Ltd., Shenzhen (CN)

(72) Inventor: Tao Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 17/790,257

(22) PCT Filed: Nov. 20, 2020

(86) PCT No.: PCT/CN2020/130466
§ 371 (c)(1),
(2) Date: Jun. 30, 2022

(87) PCT Pub. No.: WO2021/135713
PCT Pub. Date: Jul. 8, 2021

(65) Prior Publication Data
US 2023/0045631 A1    Feb. 9, 2023

(30) Foreign Application Priority Data
Dec. 30, 2019   (CN) .......................... 201911404905.4

(51) Int. Cl.
*G10L 13/02*       (2013.01)
*G10L 13/047*    (2013.01)
(52) U.S. Cl.
CPC ................................. *G10L 13/047* (2013.01)

(58) Field of Classification Search
None
See application file for complete search history.

(56) References Cited

U.S. PATENT DOCUMENTS

| | | | |
|---|---|---|---|
| 9,704,477 | B2 | 7/2017 | Zhao et al. |
| 10,186,252 | B1 | 1/2019 | Mohammadi |
| 2016/0099000 | A1 | 4/2016 | Fejzo |
| 2018/0247636 | A1 | 8/2018 | Arik et al. |
| 2021/0365641 | A1 | 11/2021 | Zhang et al. |

FOREIGN PATENT DOCUMENTS

| | | | | |
|---|---|---|---|---|
| CN | 102568471 | A | | 7/2012 |
| CN | 105023574 | A | | 11/2015 |
| CN | 106504742 | A | | 3/2017 |
| CN | 107370814 | B | | 9/2018 |
| CN | 108510975 | A | | 9/2018 |
| CN | 110223694 | A | | 9/2019 |
| CN | 110600004 | A | * | 12/2019 |
| CN | 111105778 | A | | 5/2020 |
| JP | 2009258498 | A | | 11/2009 |
| KR | 20010099454 | A | * | 11/2001 |
| WO | 2018075967 | A1 | | 4/2018 |
| WO | WO-2019237806 | A1 | * | 12/2019 | ............ G06F 40/51 |
| WO | WO-2021135713 | A1 | * | 7/2021 | ............ G10L 13/02 |

* cited by examiner

*Primary Examiner* — Shreyans A Patel
(74) *Attorney, Agent, or Firm* — Conley Rose, P.C.

(57) ABSTRACT

A text to speech processing method implemented by a terminal includes detecting an instruction to perform a text to speech conversion, sending text to a server downloading from the server, audio data based on the text, determining whether a first frame of playable audio data is downloaded within a preset duration, and continuing to download remaining audio data when the first frame is downloaded within the preset duration.

20 Claims, 6 Drawing Sheets

TEXT TO SPEECH PROCESSING METHOD, TERMINAL, AND SERVER

CROSS-REFERENCE TO RELATED APPLICATIONS

This is a U.S. National Stage of International Patent Application No. PCT/CN2020/130466 filed on Nov. 20, 2020, which claims priority to Chinese Patent Application No. 201911404905.4 filed on Dec. 30, 2019, both of which are hereby incorporated by reference in their entireties.

TECHNICAL FIELD

This application relates to the field of audio technologies, and in particular, to a text to speech processing method, a terminal, and a server.

BACKGROUND TECHNOLOGY

Currently, a text to speech (text to speech, TTS) technology becomes an important technology for man-machine conversation, and achieves an objective of "enabling a machine to speak". The TTS technology has a wide range of applications, including email reading, voice assistants, voice prompts, and the like.

The TTS technology is mainly to convert all words into corresponding speech, and then splice (or synthesize) the speech into an audio stream for playing. Currently, the speech synthesis mainly includes offline synthesis and online synthesis. The offline synthesis can be implemented by a terminal, but the terminal needs to store speech corresponding to massive words. The online synthesis may be server synthesis. Specifically, the terminal is connected to a server, and sends text to the server. After synthesizing audio corresponding to the text into an audio stream, the server sends the audio stream to the terminal for playing.

However, in an online synthesis process, time for the server to return the audio stream cannot be controlled. For example, after the terminal is connected to the server, the server takes long time to synthesize the audio stream and return the audio stream. As a result, a delay of playing the audio by the terminal is long, and this affects user experience.

SUMMARY

An objective of this application is to provide a text to speech processing method, a terminal, and a server, to reduce a delay of playing speech by the terminal.

According to a first aspect, a c processing method is provided. The method may be performed by a terminal or a chip in the terminal. The method includes: detecting an instruction used to indicate to perform text to speech conversion; sending text to a server; downloading, from the server, audio data converted from the text; determining whether a first frame of playable audio data is downloaded within preset duration; and if the first frame of playable audio data is downloaded within the preset duration, continuing to download remaining audio data.

It should be understood that network quality of the terminal or the server dynamically changes. When the network quality is good, a download speed of the terminal is high. When the network quality is poor, the download speed may be low. In this embodiment of this application, after the terminal sends the text to the server, to request the server to implement text to speech, the terminal downloads the speech data from the server. If the first frame of playable audio data is downloaded within the preset duration, the remaining audio data continues to be downloaded. If the first frame of playable audio data is not downloaded within the preset duration, an audio signal corresponding to the text is determined in an offline database, and the audio signal is synthesized into audio data. Therefore, a speech play delay of the terminal is shortened as much as possible, to avoid a case in which speech cannot be played for a long time after a user enters the text to speech instruction.

The first frame of playable audio data may be audio data that is downloaded for the first time and that has a preset length. Alternatively, the first frame of playable audio data may be data that is downloaded for the first time and that includes at least one complete audio frame.

In this embodiment of this application, the terminal and the server agree on a compression policy. For example, it is predetermined that a data length of audio data compressed by the server each time is constant and is the preset length. Alternatively, it may be agreed that audio data compressed by the server each time includes at least one complete audio frame. In this way, the terminal downloads audio data of the preset length each time, and the audio data downloaded each time includes at least one complete audio frame. To be specific, when the terminal downloads the audio data of the preset length for the first time within the preset duration, or downloads the data that includes at least one complete audio frame for the first time, the terminal may continue to download the remaining audio data. Otherwise, an offline synthesis manner is used. Therefore, the speech play delay of the terminal is shortened as much as possible, to avoid the case in which the speech cannot be played for a long time after the user enters the text to speech instruction.

In a possible design, the terminal may further store the downloaded audio data in a cache area, and when determining that memory occupation of the audio data in the cache area reaches a threshold, play the first frame of playable audio data.

It should be understood that, a specific amount of audio data stored in the cache area can ensure that a next frame of audio data continues to be played after the first frame of playable audio data is played, to ensure that the first frame of audio data is played completely and no frame freezing.

In some embodiments, that the terminal plays the first frame of playable audio data includes: transferring the first frame of playable audio data to a parser for parsing, to obtain decompressed audio data; transferring, to a decoder for decoding, the audio data that is obtained through parsing performed by the parser, to obtain audio data in a preset audio format; and transferring, to a player for playing, the audio data that is obtained through decoding performed by the decoder.

It should be noted that the foregoing is a process of smoothly playing the audio data after the terminal downloads, from the server, the first frame of playable audio data. In actual application, more or fewer of the foregoing processes may be included. This is not limited in this embodiment of this application.

In some embodiments, the audio data downloaded from the server may be but is not limited to an Opus format. Opus is a low-delay and high-fidelity speech encoding format. Compared with other encoding formats, Opus provides better fidelity.

According to a second aspect, a text to speech processing method is further provided. The method may be performed by a server or a processing chip in the server. The method includes: receiving a text to speech request sent by a terminal, where the request carries text; converting the text into audio data; compressing the audio data, where a data length of audio data obtained through compression each time is constant; and separately sending the compressed speech data to the terminal.

In this embodiment of this application, the terminal and the server agree on a compression policy. For example, it is predetermined that the server uses a static compression mechanism. For example, a data length of audio data compressed each time is constant. Alternatively, it may be agreed that a data length of the audio data is a preset length, or it may be agreed that the audio data compressed by the server each time includes at least one complete audio frame. In this way, the terminal downloads audio data of the preset length each time, and the audio data downloaded each time includes at least one complete audio frame. To be specific, when the terminal downloads the audio data of the preset length for the first time within preset duration, or downloads the data that includes at least one complete audio frame for the first time, the terminal may continue to download remaining audio data. Otherwise, an offline synthesis manner is used. Therefore, a speech play delay of the terminal is shortened as much as possible, to avoid a case in which speech cannot be played for a long time after a user enters a text to speech instruction.

In a possible design, an audio format of the audio data obtained through compression each time may be but is not limited to an Opus format. Opus is a low-delay and high-fidelity speech encoding format. Compared with other encoding formats, Opus provides better fidelity.

The terminal and the server may agree on the compression policy in a plurality of implementations, including but not limited to the following manner 1 to manner 3.

Manner 1: After determining that the static compression mechanism is used and determining the data length of the audio data compressed each time, the server may notify the terminal. For example, the server sends first indication information to the terminal. For example, the first indication information indicates the static compression mechanism used by the server, and indicates that the data length of the audio data compressed each time is the preset length, for example, 108 bytes.

Manner 2: The terminal may require the server to use the static compression mechanism, and require the data length of the audio data compressed each time to be the preset length. For example, the terminal sends second indication information to the server. The second indication information is used to indicate the server to use the static compression mechanism and indicate that the data length of the audio data compressed by the server each time is the preset length, for example, 108 bytes.

Manner 3: When a server manufacturer produces the server, the server manufacturer specifies, by default, that the server uses the static compression mechanism, and the data length of the audio data compressed each time is the preset length, for example, 108 bytes. When downloading an audio stream, the terminal downloads an audio stream whose data length is the preset length by default.

According to the foregoing manners, the terminal and the server may agree on the compression policy more flexibly and in more optional manners.

According to a third aspect, an embodiment of this application further provides a terminal. The terminal includes modules/units that perform the method according to any one of the first aspect or the possible designs of the first aspect. These modules/units may be implemented by hardware, or may be implemented by hardware by executing corresponding software.

According to a fourth aspect, an embodiment of this application further provides a server. The server includes modules/units that perform the method according to any one of the second aspect or the possible designs of the second aspect. These modules/units may be implemented by hardware, or may be implemented by hardware by executing corresponding software.

According to a fifth aspect, a terminal is further provided, including: a communications module, configured to communicate with another device; one or more processors; and one or more memories. The one or more memories store one or more computer programs, the one or more computer programs include instructions, and when the instructions are executed by the one or more processors, the terminal is enabled to perform the steps of the method provided in the first aspect.

According to a sixth aspect, a server is further provided, including: a communications module, configured to communicate with another device; one or more processors; and one or more memories. The one or more memories store one or more computer programs, the one or more computer programs include instructions, and when the instructions are executed by the one or more processors, the server is enabled to perform the steps of the method provided in the second aspect.

According to a seventh aspect, an embodiment of this application provides a chip. The chip is coupled to a memory in a terminal, and is configured to perform the technical solution in any one of the first aspect of embodiments of this application or the possible designs of the first aspect. In this embodiment of this application, "coupling" means that two components are directly or indirectly connected to each other.

According to an eighth aspect, an embodiment of this application provides a chip. The chip is coupled to a memory in a server, and is configured to perform the technical solution in any one of the second aspect of embodiments of this application or the possible designs of the second aspect. In this embodiment of this application, "coupling" means that two components are directly or indirectly connected to each other.

According to a ninth aspect, a communications system is further provided, including the terminal provided in the third aspect or the fifth aspect and the server provided in the fourth aspect or the sixth aspect.

According to a tenth aspect, a computer-readable storage medium is further provided. The computer-readable storage medium stores a computer program. The computer program includes program instructions. When the program instructions are executed by a computer, the computer is enabled to perform the method provided in the first aspect.

According to an eleventh aspect, a computer-readable storage medium is further provided. The computer-readable storage medium stores a computer program. The computer program includes program instructions. When the program instructions are executed by a computer, the computer is enabled to perform the method provided in the second aspect.

According to a twelfth aspect, a program product is further provided. The program product stores a computer program, the computer program includes program instructions, and when the program instructions are executed by a computer, the computer is enabled to perform the method provided in the first aspect.

According to a thirteenth aspect, a program product is further provided. The program product stores a computer program, the computer program includes program instructions, and when the program instructions are executed by a computer, the computer is enabled to perform the method provided in the second aspect.

For specific technical effects that can be achieved in each of the third aspect to the thirteenth aspect, refer to effect descriptions of corresponding designs in the first aspect and the second aspect. Details are not described herein again.

DESCRIPTION OF EMBODIMENTS

Technical solutions in embodiments of this application are described in detail below with reference to accompanying drawings of the following embodiments of this application.

The following describes some terms in embodiments of this application to help a person skilled in the art have a better understanding.

Terminals includes, for example, a mobile phone (mobile phone), a tablet computer, a notebook computer, a palmtop computer, a mobile internet device (mobile internet device, MID), a wearable device (for example, a watch, a wristband, or a smart helmet), a virtual reality (virtual reality, VR) device, an augmented reality (augmented reality, AR) device, an ultra-mobile personal computer (ultra-mobile personal computer, UMPC), a netbook, a personal digital assistant (personal digital assistant, PDA), a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), or a wireless terminal in a smart home (smart home). An audio processing method provided in embodiments of this application is applicable to any one of the foregoing terminals.

In embodiments of this application, an apparatus configured to implement a function of a terminal side in embodiments of this application may be a terminal, or may be an apparatus that can support implementation of the function, for example, a chip system. The apparatus may be installed in the terminal.

A server is used to implement text to speech and synthesize the speech into an audio stream, and may be referred to as a "TTS server".

In embodiments of this application, an apparatus configured to implement a function of a server side in embodiments of this application may be a server, or may be an apparatus that can support implementation of the function, for example, a chip system. The apparatus may be installed in the server.

Currently, online audio synthesis may be performed by the server. Specifically, the terminal is connected to the server, and sends text to the server. After synthesizing audio corresponding to the text into an audio stream, the server sends the audio stream to the terminal for playing.

Figure 1:
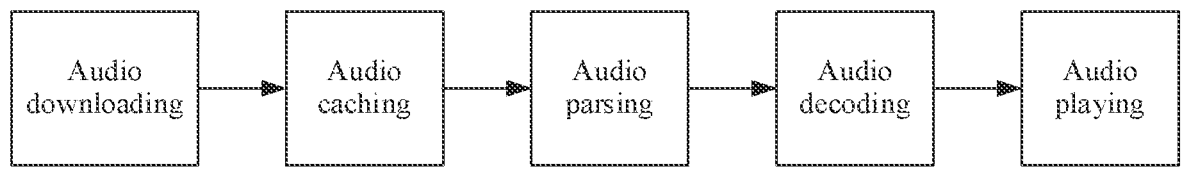
FIG. 1 is a schematic flowchart of text to speech in the conventional technology.

FIG. 1 is a schematic diagram of a process of implementing text to speech by a terminal in the conventional technology. After a terminal is connected to a server (for example, a TTS server), audio playing is implemented through at least the following five steps:

1: The terminal downloads an audio stream from the server. 2: Cache the downloaded audio stream to a cache area. A threshold of the cache area is 10 M. That is, when a size of the audio stream cached in the cache area is greater than 10 M, the audio stream goes to the next step. 3: A parser parses the audio stream, for example, decompresses the audio stream and determines a quantity of frames included in the audio stream. 4: A decoder decodes an audio stream obtain through parsing, to obtain an audio stream in a pulse code modulation (pulse code modulation, PCM) format. 5: Transfer the audio stream in the PCM format to a player for playing.

In the preceding process, time for the server to return audio stream cannot be controlled. For example, after the terminal is successfully connected to the server, the server takes a long time to synthesize an audio stream and return the audio stream. As a result, an overall audio playing delay is long, and this affects user experience.

In view of this, an embodiment of this application provides a text to speech processing method. The terminal requests the server to synthesize speech online. If a first frame of playable audio data is returned within preset duration, an online synthesis manner may continue to be used. If the first frame of playable audio data is not returned within the preset duration, an offline synthesis manner is used to reduce the audio playing delay.

Figure 2:
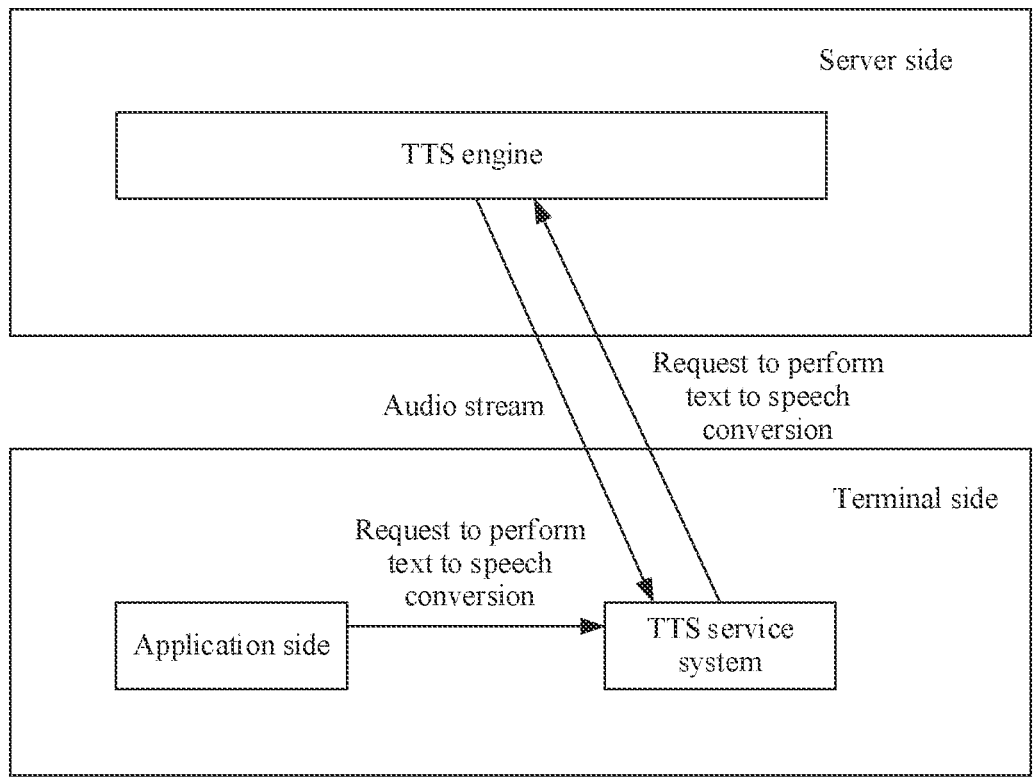
FIG. 2 is a schematic diagram of a system architecture according to an embodiment of this application.

FIG. 2 is a functional block diagram of an example of a system architecture according to an embodiment of this application. As shown in FIG. 2, a terminal includes an application side and a TTS service system. The application side includes a plurality of applications (applications, app for short), for example, a voice assistant, WeChat, and e-mail. The TTS service system is used to implement text to speech.

One application on the application side requests the TTS service system to perform text to speech conversion. The TTS service system may select an online synthesis manner or an offline synthesis manner. For example, the TTS service system prefers the online synthesis manner. To be specific, the TTS service system sends a connection request to a server side, used to request to establish a connection with the server side. If the terminal can be successfully connected to the server within preset duration, the online synthesis manner is used. If the terminal cannot be connected to the server within the preset duration, the offline synthesis manner is used.

For another example, the TTS service system may determine a size of text content. If the text content is small, the offline synthesis manner may be used, and if the text content is large, the online synthesis manner may be used.

For another example, the TTS service system preferably uses the offline synthesis manner, and if speech corresponding to specific text does not exist in an offline database in the terminal, the TTS service system uses the online synthesis manner.

After the TTS service system is successfully connected to the server, the TTS server can send text to the server. After determining a speech synthesis audio stream corresponding to the text, the server sends the audio stream to the TTS service system. The TTS service system sends the audio stream to a player (for example, a speaker) for playing. Alternatively, after determining speech corresponding to all or a part of text in the offline database, the TTS service system sends the determined speech to the server, and the server performs speech synthesis.

In some embodiments, when the server performs online synthesis, if a network of the server is poor, the terminal may switch to the offline synthesis manner. For example, when the server performs online synthesis, if a connection is interrupted due to poor network quality, the server may send, to the terminal, error code indicating network interruption. After receiving the error code, the terminal may switch to offline synthesis.

In some other embodiments, there may be more than one server for speech synthesis. For example, there may be two servers for speech synthesis. One is a primary server, and the other is a secondary server. When the terminal is successfully connected to the primary server within first preset duration, the terminal performs online synthesis by using the primary server. If the terminal is not successfully connected to the primary server within the first preset duration, the terminal is connected to the secondary server, and if the terminal is successfully connected to the secondary server within second preset duration, the terminal performs online synthesis by using the secondary server. If the terminal fails to connect to the secondary server within the second preset duration, the offline synthesis manner is used again.

That one application on the application side requests the TTS service system to perform text to speech conversion includes a plurality of cases. For example, the voice assistant is used as an example. The voice assistant receives a sound signal entered by a user, and the sound signal is "open WeChat". The TTS service system determines a response signal corresponding to the sound signal. For example, the response signal is "WeChat has been opened", and the TTS service system synthesizes text of "WeChat has been opened" into speech. For another example, Toutiao is used as an example. After detecting a text to speech instruction, a Toutiao application requests the TTS service system to perform text to speech conversion and play news by speech.

In some other embodiments, before requesting the TTS service system to perform text to speech conversion, the application on the application side may log in to the TTS service system. For example, the application sends login information to the TTS service system. The login information may include information such as a name of the application, and a current login account and password of the application. The TTS service system performs authorization on the application based on the login information, for example, determines whether the login information is consistent with pre-stored login information. If the login information is consistent with the pre-stored login information, the TTS service system agrees the application to log in to the TTS service system, and performs text to speech. If the login information is inconsistent with the pre-stored login information, the TTS service system refuses the application to log in to the TTS service system. If the authentication fails, the application can switch to offline synthesis to ensure successful text to speech.

Figure 3:
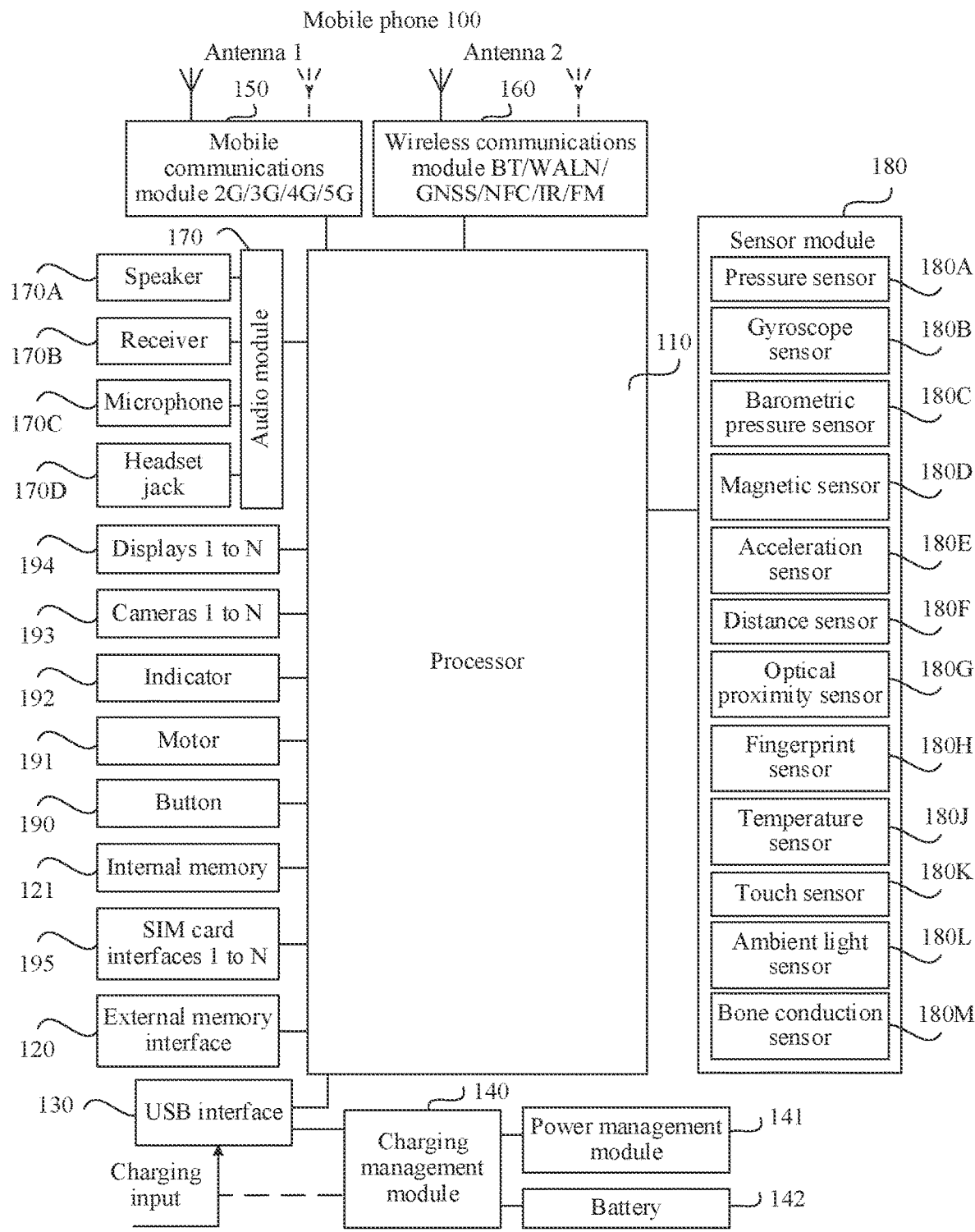
FIG. 3 is a schematic diagram of a structure of a terminal according to an embodiment of this application.

FIG. 3 is a schematic diagram of a structure of an example of a terminal according to an embodiment of this application. As shown in FIG. 3, the mobile terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors. The controller may be a nerve center and a command center of the terminal 100. The controller may generate an operation control signal based on instruction operation code and a time sequence signal, to complete control of instruction fetching and instruction execution. A memory may further be disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access and reduces waiting time of the processor 110, so that system efficiency is improved.

The USB interface 130 is an interface that conforms to USB standard specifications, and may be specifically a mini USB interface, a micro USB interface, a USB Type C interface, or the like. The USB interface 130 may be configured to connect to a charger to charge the terminal 100, and may also be configured to transmit data between the terminal 100 and a peripheral device. The charging management module 140 is configured to receive charging input from a charger. The power management module 141 is configured to connect the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communications module 160, and the like.

A wireless communications function of the terminal 100 may be implemented by using an antenna 1, an antenna 2, the mobile communications module 150, the wireless communications module 160, the modem processor, the baseband processor, and the like. The antenna 1 and the antenna 2 are configured to transmit and receive electromagnetic wave signals. Each antenna in the terminal 100 may be configured to cover one or more communications frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the terminal 100, for wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some functional modules of the mobile communications module 150 may be disposed in a same device as at least some modules of the processor 110.

The wireless communications module 160 may provide a solution, applied to the terminal 100, for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communications module 160 may be one or more devices integrating at least one communications processing module. The wireless communication module 160 receives an electromagnetic wave through the antenna 2, performs processing such as filtering or amplification on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (beidou navigation satellite system, BDS), a quasi-zenith satellite system (quasi-zenith satellite system, QZSS), and/or a satellite based augmentation system (satellite based augmentation systems. SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and the image is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the terminal 100 may include one or N cameras 193, where N is a positive integer greater than 1. In some examples, the one or N cameras 193 may include at least one wide-angle camera, and the wide-angle camera is configured to capture an image with a large angle of view.

The digital signal processor is configured to process a digital signal, and in addition to a digital image signal, may further process another digital signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, with reference to a transfer mode between human brain neurons, and may further continuously perform self-learning. Applications such as intelligent cognition of the terminal 100 may be implemented by using the NPU, for example, image recognition, facial recognition, speech recognition, and text understanding.

The internal memory 121 may be configured to store computer-executable program code, and the executable program code includes instructions. The processor 110 runs the instructions stored in the internal memory 121, to implement various function applications and data processing of the terminal 100. The internal memory 121 may include a program storage area and a data storage area. The program storage area may store an operating system, software code of at least one application (such as an iQIYI application or a WeChat application), and the like. The data storage area may store data (for example, an image and a video) and the like generated when the terminal 100 is used. In addition, the internal memory 121 may include a high-speed random access memory, and may further include a nonvolatile memory, for example, at least one magnetic disk storage device, a flash memory device, or a universal flash storage (universal flash storage, UFS).

The external memory interface 120 may be configured to connect to an external storage card such as a micro SD card, to extend a storage capability of the terminal. The external storage card communicates with the processor 110 through the external memory interface 120, to implement a data storage function. For example, a file such as an image or a video is stored in the external storage card.

The terminal 100 may implement audio functions such as music playing and recording through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a moving posture of the terminal 100. In some embodiments, angular velocities of the terminal 100 around three axes (namely, x, y, and z axes) may be determined by using the gyro sensor 180B.

The gyroscope sensor 180B may be configured to perform image stabilization during photographing. The barometric pressure sensor 180C is configured to measure barometric pressure. In some embodiments, the terminal 100 calculates an altitude by using a barometric pressure value measured by the barometric pressure sensor 180C, to assist positioning and navigation. The magnetic sensor 180D includes a Hall effect sensor. The terminal 100 may detect opening and closing of a flip cover case by using the magnetic sensor 180D. In some embodiments, w % ben the terminal 100 is a clamshell phone, the terminal 100 may detect opening and closing of the flip cover by using the magnetic sensor 180D. Further, a feature such as automatic unlocking upon opening of the flip cover is set based on a detected opening or closing state of the flip cover. The acceleration sensor 180E may detect values of accelerations of the terminal 100 in various directions (usually on three axes). When the terminal 100 is still, a value and a direction of gravity may be detected. The acceleration sensor 180E may further be configured to recognize a posture of the terminal 100, and is applied in an application such as a pedometer or screen switching between a landscape mode and a portrait mode.

The distance sensor 180F is configured to measure a distance. The terminal 100 may measure a distance through infrared light or a laser. In some embodiments, the terminal 100 may use the distance sensor 180F to measure a distance, to implement fast focusing in a photographing scenario. The optical proximity sensor 180G may include a light-emitting diode (LED) and an optical detector, for example, a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a flip cover mode or a pocket mode to automatically unlock or lock the screen.

The ambient light sensor 180L is configured to sense ambient light brightness. The terminal 100 may adaptively adjust brightness of the display 194 based on the sensed ambient light brightness. The ambient light sensor 180L may further be configured to automatically adjust white balance during photographing. The ambient light sensor 180L may also cooperate with the optical proximity sensor 180G to detect whether the terminal 100 is in a pocket to prevent a false touch. The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using a temperature detected by the temperature sensor 1803. For example, when the temperature reported by the temperature sensor 1803 exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse to receive a blood pressure beating signal.

The button 190 includes a power button, a volume button, and the like. The button 190 may be a mechanical button, or may be a touch button. The terminal 100 may receive a button input, and generate a button signal input related to a user setting and function control of the terminal 100. The motor 191 may generate a vibration prompt. The motor 191 may be configured to provide an incoming call vibration prompt or a touch vibration feedback. For example, touch operations performed on different applications (for example, a photographing application and an audio playing application) may correspond to different vibration feedback effects. A touch vibration feedback effect may further be customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or plugged from the SIM card interface 195, to implement contact with or separation from the terminal 100.

It may be understood that the components shown in FIG. 2 do not constitute a specific limitation on the terminal 100. The mobile phone may further include more or fewer components than those shown in the figure, or combine some components, or split some components, or have different component arrangements. In addition, a combination/connection relationship between the components in FIG. 2 may also be adjusted and modified.

The following describes this embodiment of the present invention in detail with reference to the structure of the terminal 100 shown in FIG. 2. Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "an embodiment", "some embodiments", or the like described in this specification means that one or more embodiments of this application include a specific feature, structure, or characteristic described with reference to embodiments. Therefore, statements such as "in an embodiment", "in some embodiments". "in some other embodiments", and "in other embodiments" that appear at different places in this specification do not necessarily mean reference to a same embodiment, instead, they mean "one or more but not all of embodiments", unless otherwise specifically emphasized. Terms "include", "contain", "have", and their variants all mean "include but are not limited to", unless otherwise specifically emphasized.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ". "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Figure 4:
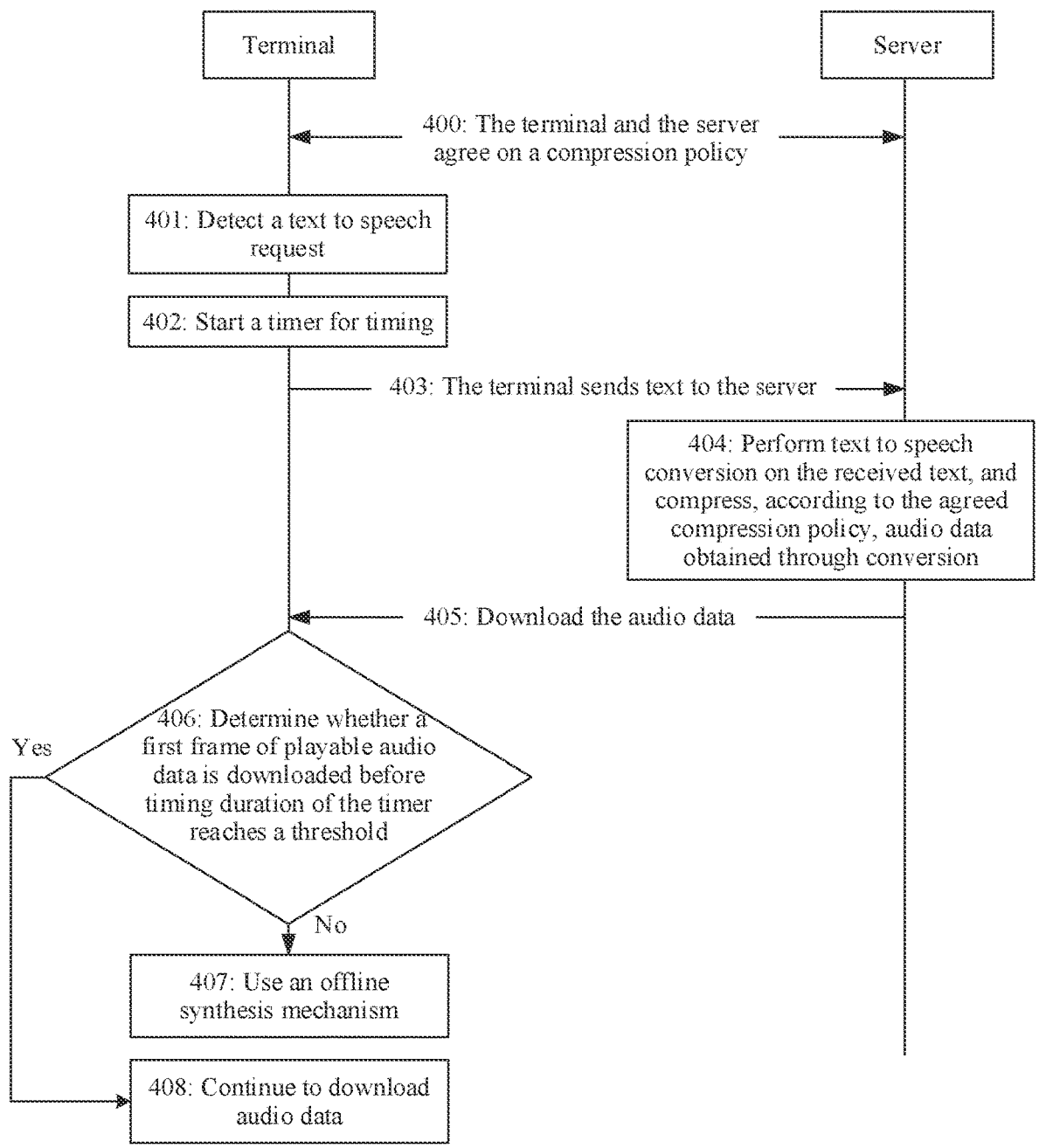
FIG. 4 is a schematic flowchart of text to speech according to an embodiment of this application.

FIG. 4 is a schematic flowchart of an example of a text to speech processing method according to an embodiment of this application. As shown in FIG. 4, a procedure of the method includes the following steps.

400: A terminal and a server agree on a compression policy.

The compression policy includes a static compression mechanism (constents bitrate, CBR). The static compression mechanism means that a data length of audio data compressed each time is constant. The data length may be understood as a quantity of bytes or bits occupied by the data. For example, the data length is 108 bytes.

The compression policy may further include that the audio data compressed each time includes at least one complete audio frame. Herein, a complete audio frame means that the audio data compressed each time includes a frame header and a frame trailer corresponding to a complete audio frame.

The compression policy may further include that the data length of the audio data compressed each time is a preset length. The preset length may be determined in advance, for example, determined according to the following formula:

$$\text{Data length} = ((\text{Quantity of samples per frame}/8) \times \text{Bit rate})/\text{Sampling rate}.$$

The quantity of samples per frame is data sampled from a complete audio frame. The sampling rate, namely, a sampling frequency, may be understood as data sampled per second. Generally, a higher sampling frequency indicates more realistic sound restoration. The bit rate may be understood as a quantity of bits transmitted per second, which is also called a data transmission rate. In some embodiments, bit rate/sampling rate may be a preset value, or related to sound quality. For example, good sound quality corresponds to a larger value of bit rate/sampling rate, and poor sound quality corresponds to a smaller value of bit rate/sampling rate. Therefore, the terminal may determine bit rate/sampling rate based on sound quality of a player, and then determine the preset length, that is, the data length of the audio data compressed each time, by using the foregoing formula.

The "agreement" herein may be implemented in a plurality of manners, including but not limited to the following manner 1 to manner 3.

Manner 1: After determining that the static compression mechanism is used and determining the data length of the audio data compressed each time, the server may notify the terminal. For example, the server sends first indication information to the terminal. For example, the first indication information indicates the static compression mechanism used by the server, and indicates that the data length of the audio data compressed each time is the preset length, for example, 108 bytes.

Manner 2: The terminal may require the server to use the static compression mechanism, and require the data length of the audio data compressed each time to be the preset length. For example, the terminal sends second indication information to the server. The second indication information is used to indicate the server to use the static compression mechanism and indicate that the data length of the audio data compressed by the server each time is the preset length, for example, 108 bytes.

Manner 3: When a server manufacturer produces the server, the server manufacturer specifies, by default, that the server uses the static compression mechanism, and the data length of the audio data compressed each time is the preset length, for example, 108 bytes. When downloading an audio stream, the terminal downloads an audio stream whose data length is the preset length by default.

It may be understood that, the terminal plays the audio stream by frame. Generally, a frame header (or referred to as a code header) and a frame trailer (or referred to as a code trailer) of each frame are identified in the audio stream. The terminal parses the frame header and the frame trailer of each frame in the audio stream, and then plays the audio stream frame by frame.

The server and the terminal agree that the data length of the audio data compressed each time is constant and is the preset length, and the audio data of the data length includes at least one complete audio frame, that is, includes a frame header and a frame trailer corresponding to at least one audio frame. Therefore, the terminal may download the audio stream according to the agreed data length.

For example, it is assumed that the agreed data length is 108 bytes. In this case, the data length of the audio data compressed by the server each time is 108 bytes, and the terminal downloads 108-byte audio data each time. The 108-byte audio data includes at least one complete audio frame, that is, includes a frame header and a frame trailer that correspond to at least one audio frame. Therefore, because the 108-byte audio data includes at least one complete audio frame, the 108-byte audio data downloaded by the terminal each time is an audio stream that can be played.

Figure 5:
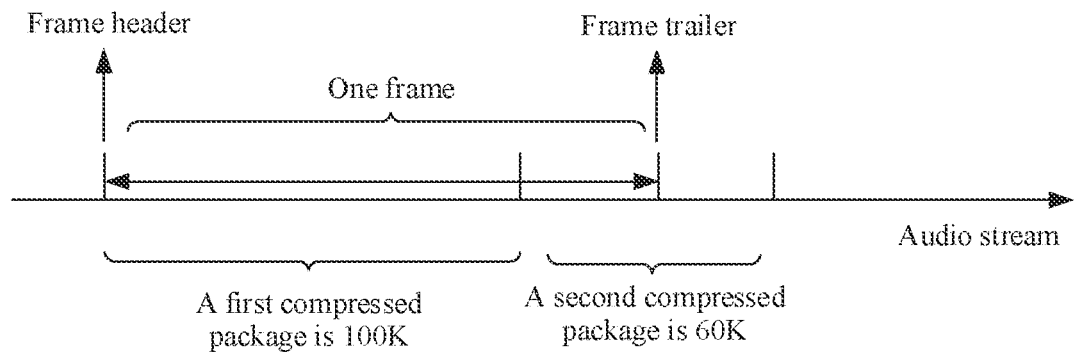
FIG. 5 is a schematic diagram of a dynamic compression mechanism according to an embodiment of this application.

It should be noted that, in the conventional technology, the server uses a dynamic compression mechanism (variable bitrate, VBR). The dynamic compression mechanism means that audio data compressed each time has a different data length. For example, the audio data compressed by the server includes two compressed packages. A length of audio data in one compressed package is 100K, and a length of audio data in the other compressed package is 60K. Because a length of dynamically compressed audio data is not fixed, audio data included in a compressed package may be less than one frame, for example, does not include a complete audio frame, or for another example, includes only a frame header of one audio frame but does not include a frame trailer of the audio frame. FIG. 5 is a schematic diagram of a dynamic compression mechanism. It is assumed that the audio data compressed by the server includes two compressed packages, a first compressed package includes 100K, and a second compressed package includes 60K. The first compressed package and first 40K in the second compressed package belong to one complete audio frame. In this case, when the terminal receives only the first compressed package, the terminal cannot play the first compressed package.

Therefore, in the conventional technology, each time the terminal downloads a compressed package, the terminal needs to determine, through parsing by using a parser, whether the compressed package includes at least one complete audio frame. If the compressed package includes at least one complete audio frame, the terminal plays audio data. Before parsing the compressed package by using the parser, the terminal cannot determine whether the compressed package can be played.

In this embodiment of this application, the terminal and the server agree that the data length of the audio data compressed each time (that is, a compression ratio obtained through compression each time) is constant and is the preset length (for example, 108 bytes), and the audio data of the data length includes at least one complete audio frame, that is, includes a frame header and a frame trailer corresponding to at least one complete audio frame. Therefore, each time the terminal downloads audio data of the preset length (for example, 108 bytes), because the audio data downloaded each time includes at least one complete audio frame, the audio data downloaded each time can be played. To be specific, each time after downloading compressed audio data, the terminal may determine that the audio data can be played without waiting for the parser to parse the compressed audio data.

401: The terminal detects a text to speech request.

For example, the terminal may include a TTS service system. Different applications in the terminal may invoke the TTS service system to request conversion from text to speech. The different applications may include a voice assistant, WeChat, and the like. Therefore, the text to speech request may be a request that is initiated by an application for invoking the TTS service system. For example, the voice assistant is used as an example. A user sends a sound signal "Hello, Huawei, open Weibo". After detecting the sound signal, the terminal invokes the TTS service system to implement text to speech conversion through the TTS service system, and then outputs speech information of "Weibo opened".

402: The terminal starts a timer to start timing.

It should be understood that, after detecting the text to speech request, the terminal may start the timer.

403: The terminal sends text that needs to be converted to the server.

403 and 402 may be performed at the same time, or may not be performed at the same time, and an execution sequence of 403 and 402 is not limited.

It may be understood that before 403, a process of connecting the terminal to the server may be further included. A connection between the terminal and the server is, for example, an IP connection or a TCP connection. This is not limited in this embodiment of this application.

404: The server performs speech conversion based on the received text, and compresses, according to the agreed compression policy, audio data obtained through conversion. A format of the audio data may be, for example, an Opus format.

As described above, the terminal and the server agree that the data length of the audio data compressed each time is constant, and the audio data of the data length includes at least one complete audio frame, that is, includes a frame header and a frame trailer corresponding to at least one audio frame. For example, if the agreed data length is 108 bytes, the audio data compressed by the server each time includes 108 bytes, and the 108 bytes include at least one complete audio frame.

405: The terminal downloads the audio data.

Assuming that the agreed data length is 108 bytes, the terminal downloads 108 bytes of audio data each time, and the 108 bytes include at least one complete audio frame.

406: The terminal determines whether a first frame of playable audio data is downloaded before timing duration of the timer reaches a threshold. If the first frame of playable audio data is not downloaded, 407 is performed. If the first frame of playable audio data is downloaded, 408 is performed.

The threshold may be set in advance, for example, set by default before the terminal is delivered from a factory, or may be customized by the user, for example, may be 1.5 s. This is not limited in this embodiment of this application.

As described above, the terminal and the server agree that the data length of the audio data compressed each time is constant and is the preset length, and the audio data of the data length includes at least one complete audio frame, that is, includes a frame header and a frame trailer corresponding to at least one audio frame. Therefore, audio data of the preset length downloaded by the terminal each time is audio data that can be played.

Therefore, the first frame of playable audio data includes audio data of the preset length (for example, 108 bytes) that is downloaded by the terminal for the first time. Alternatively, the first frame of playable audio data is data that is downloaded for the first time and that includes at least one complete audio frame, or is data that is downloaded for the first time and that includes a frame header and a frame trailer corresponding to at least one complete audio frame.

For example, the preset length is 108 bytes. That the terminal determines whether the first frame of playable audio data is downloaded may include: determining whether 108 bytes are downloaded. It is assumed that 108 bytes are successfully downloaded, that is, the first frame of playable audio data is downloaded, before the timer threshold (for example, 1.5 s) is reached. Therefore, the terminal may continue to download remaining audio data. If 108 bytes are not successfully downloaded before the timing duration reaches 1.5 s, an online synthesis manner is abandoned and an offline synthesis manner is used.

407: The terminal uses an offline synthesis mechanism.

Before the timer threshold is reached, if the terminal does not download the first frame of playable audio data, the offline synthesis mechanism may be used. The offline synthesis mechanism may be that the terminal determines, from an offline database, speech corresponding to the text, and then synthesizes the speech into audio data. The offline database may be stored in the terminal in advance.

408: The terminal continues to download audio data.

Before the timer threshold is reached, if the terminal downloads the first frame of playable audio data, the terminal may continue to download audio data. In this case, the terminal may choose to turn off the timer.

Therefore, in this embodiment of this application, after the terminal sends the text to the server, if the terminal does not download the first frame of playable audio data within preset duration, the terminal switches to offline synthesis, to reduce an audio play delay of the terminal.

Figure 6:
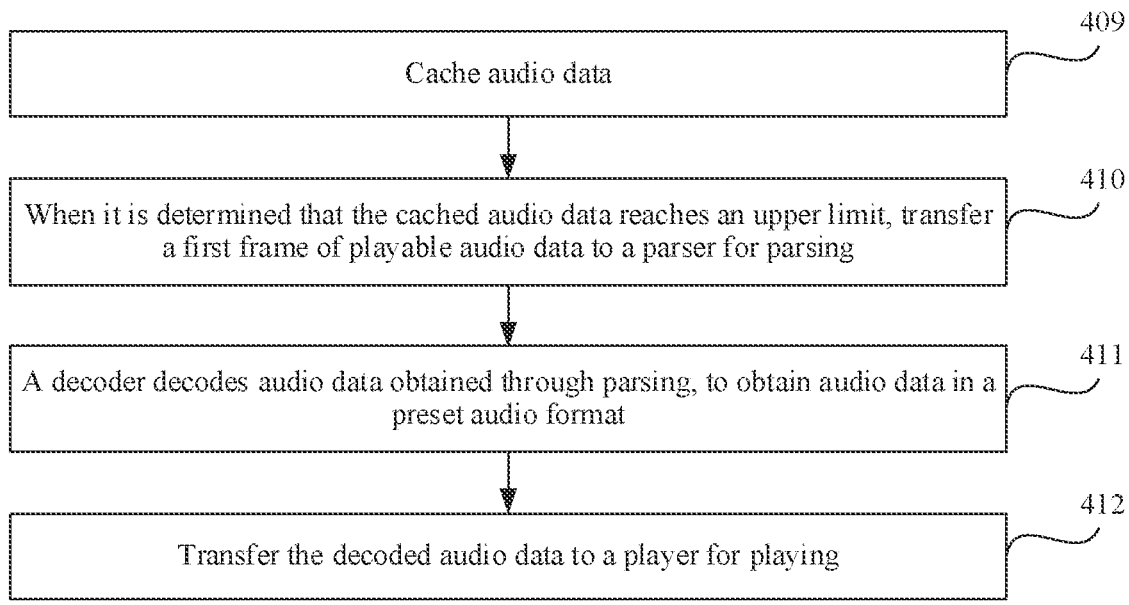
FIG. 6 is another schematic flowchart of text to speech according to an embodiment of this application.

In some other embodiments, after step 408, 409 and 410 shown in FIG. 6 may be further included.

409: The terminal caches audio data.

410: When determining that the cached audio data reaches an upper limit, the terminal transfers the downloaded first frame of playable audio data to the parser for parsing. The upper limit is, for example, 1 M or 5 M. This is not limited in this embodiment of this application.

Figure 7:
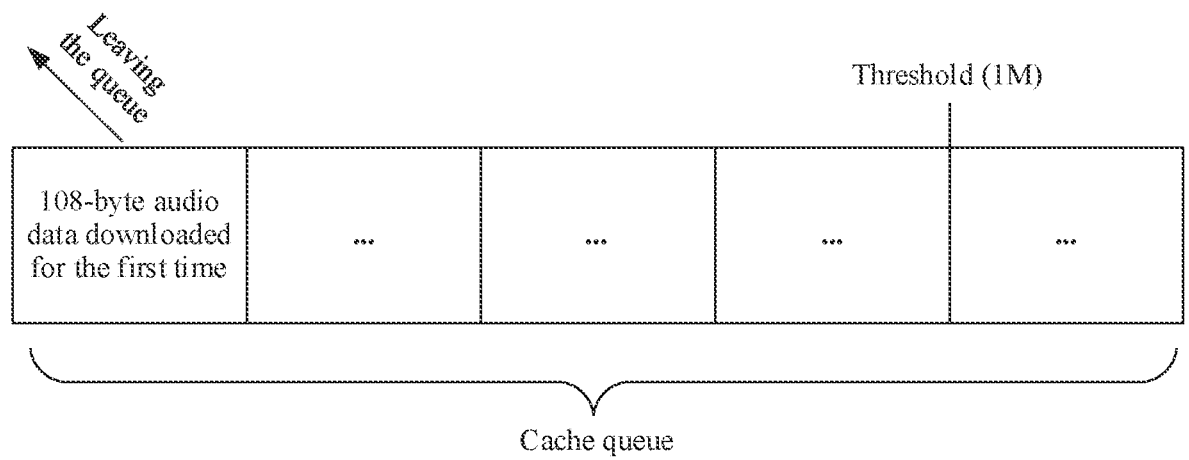
FIG. 7 is a schematic diagram of a cache queue according to an embodiment of this application.

FIG. 7 is a schematic diagram of a cache queue according to an embodiment of this application. An upper limit (or referred to as a threshold) of the cache queue is 1 M. When the upper limit is reached, the downloaded first frame of playable audio data (for example, 108-byte audio data downloaded for the first time) is transferred to the parser. Then, the terminal continues to download audio data and stores the audio data in the cache queue. The cache queue facilitates audio playing without frame freezing.

It should be noted that, in this embodiment of this application, the upper limit of the cache queue is set to be relatively low (less than 10 M in the conventional technology), so that it can be ensured that the audio data is transferred to the parser as soon as possible for parsing.

It may be understood that a process in which the parser parses the audio data is, for example, decompressing the audio data (audio data downloaded from the server is compressed audio data), and obtaining a frame header, a frame trailer, and the like in the audio data through parsing, so that the player identifies the frame header and the frame trailer.

411: A decoder decodes audio data obtained through parsing, to obtain audio data in a preset audio format. It may be understood that a process of decoding the audio data by the decoder may be understood as a process of performing format conversion on the audio data, for example, converting a format of the audio data into a playable audio format, for example, a PCM format.

412: The terminal transfers the decoded audio data to the player for playing.

Figure 8:
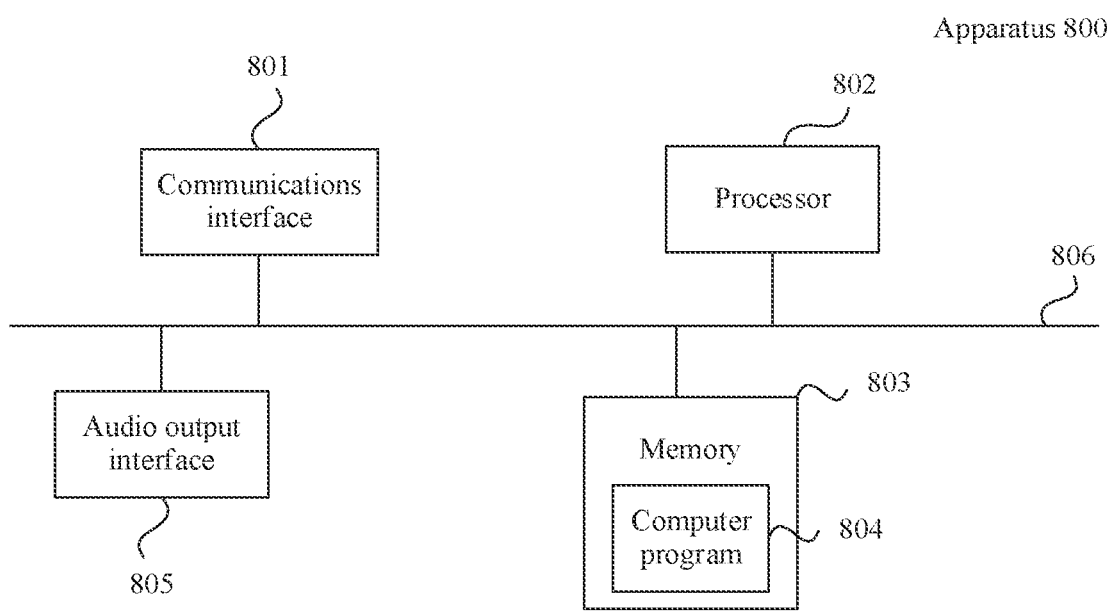
FIG. 8 is a schematic diagram of a structure of an apparatus according to an embodiment of this application.

As shown in FIG. 8, some other embodiments of this application disclose an apparatus 800. The apparatus may be the foregoing terminal, and the apparatus 800 may have an audio output interface 805, for example, a speaker. The electronic device may further include a communications interface 801, one or more processors 802, one or more memories 803, and one or more computer programs 804. The foregoing components may be connected through one or more communications buses 806. Certainly, the electronic device may further include another component, for example, a display.

The one or more computer programs 804 are stored in the memory 803 and are configured to be executed by the one or more processors 802. The one or more computer programs 804 include instructions, and the instructions may be used to perform the steps of the terminal in the embodiment corresponding to FIG. 4.

For example, the electronic device shown in FIG. 8 may be the mobile phone shown in FIG. 4. In this case, the one or more processors 802 may be the processor 110, the audio output interface 805 may be the speaker, and the one or more memories 803 may be the internal memory 121.

Figure 9:
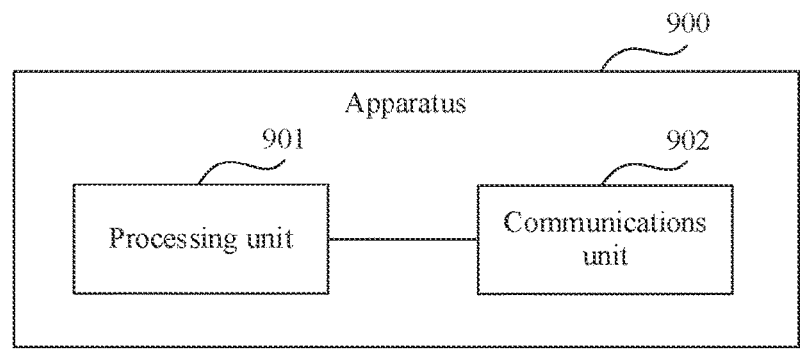
FIG. 9 is a functional block diagram of another apparatus according to an embodiment of this application.

As shown in FIG. 9, some other embodiments of this application disclose an apparatus 900. The apparatus 900 may be the foregoing server, or may be an apparatus in the server, for example, a chip system. The chip system may include a chip, or may include a chip and another discrete component.

The apparatus 900 includes a processing unit 901 and a communications unit 902. The communications unit 902 is configured to receive a text to speech request sent by a terminal, where the request carries text. The processing unit 901 is configured to convert the text into audio data, and compress the audio data, where audio data obtained through compression each time has a constant data length. The communications unit 902 is further configured to separately send the speech data obtained through compression to the terminal.

A data length of the audio data obtained by the processing unit 901 through compression each time may be a preset length. Alternatively, the audio data obtained by the processing unit 901 through compression each time may include at least one complete audio frame. Optionally, the communications unit 902 may further notify the terminal of the data length of the audio data compressed by the server each time.

In addition, an audio format of the audio data obtained by the processing unit 901 through compression each time may be but is not limited to an Opus format.

For specific execution processes of the processing unit 901 and the communications unit 902 and technical effects that can be achieved by the solutions, refer to records in the foregoing method embodiments. In embodiments of this application, division of modules is an example, and is merely logical function division. In an actual implementation, there may be another division manner. In addition, function modules in embodiments of this application may be integrated into one processor, or each of the modules may exist alone physically, or two or more modules may be integrated into one module. The foregoing integrated module may be implemented in a form of hardware, or may be implemented in a form of a software function module.

Figure 10:
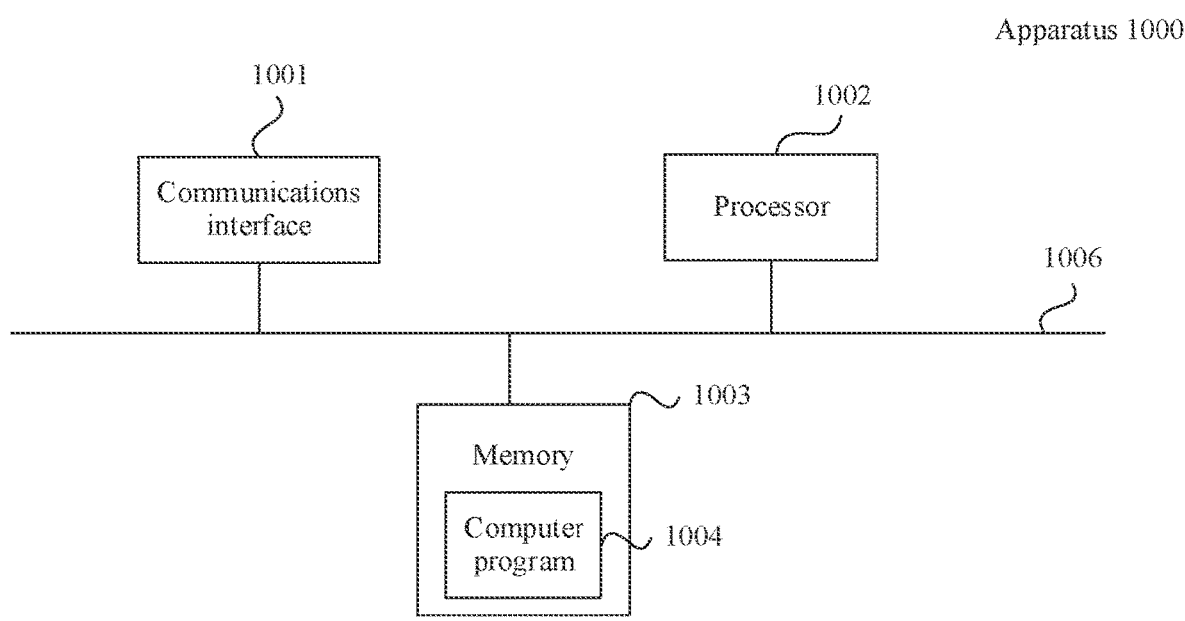
FIG. 10 is a schematic diagram of a structure of an apparatus according to an embodiment of this application.

As shown in FIG. 10, some other embodiments of this application disclose an apparatus 1000. The apparatus 1000 may be the foregoing server, or may be an apparatus in the server, for example, a chip system. The chip system may include a chip, or may include a chip and another discrete component.

The apparatus 1000 may include a communications interface 1001, one or more processors 1002, one or more memories 1003, and one or more computer programs 1004. The foregoing components may be connected through one or more communications buses 1006. The communications interface 1001 is configured to communicate with another device by using a transmission medium. The one or more computer programs 1004 are stored in the memory 1003 and are configured to be executed by the one or more processors 1002. The one or more computer programs 1004 include instructions, and the instructions may be used to perform the steps of the server in the embodiment corresponding to FIG. 4.

The communications interface 1001 may be a transceiver, a circuit, a bus, a module, or another type of communications interface. The processor 1002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module. The memory 1003 may be a nonvolatile memory such as a hard disk drive (hard disk drive, HDD) or a solid-state drive (solid-state drive. SSD), or may be a volatile memory (volatile memory), for example, a random-access memory (random-access memory, RAM). The memory is any other medium that can be used to carry or store expected program code in a form of an instruction structure or a data structure and that can be accessed by a computer, but is not limited thereto. The memory in this embodiment of this application may alternatively be a circuit or any other apparatus that can implement a storage function. The memory 1003 is coupled with the processor 1002. Coupling in this embodiment of this application is indirect coupling or a communication connection between apparatuses, units, or modules, may be in an electrical form, a mechanical form, or another form, and is used for information exchange between apparatuses, units, or modules. In another implementation, the memory 1003 may alternatively be located outside the apparatus 1000. The processor 1002 may operate in cooperation with the memory 1003. The processor 1002 may execute the program instructions stored in the memory 1003. At least one of the at least one memory 1003 may alternatively be included in the processor 1002. A connection medium between the communications interface 1001, the processor 1002, and the memory 1003 is not limited in this embodiment of this application. For example, in this embodiment of this application, the memory 1003, the processor 1002, and the communications interface 1001 may be connected through a bus in FIG. 10. The bus may be classified into an address bus, a data bus, a control bus, or the like.

It may be understood that the apparatus in the embodiment shown in FIG. 9 may be implemented by the apparatus 1000 shown in FIG. 10. Specifically, the processing unit 901 may be implemented by the processor 1002, and the communications unit 902 may be implemented by the communications interface 1001.

All or a part of the foregoing embodiments may be implemented by software, hardware, firmware, or any combination thereof. When the software is used to implement the embodiments, all or a part of embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (Solid State Disk, SSD)), or the like.

It should be noted that a part of the present patent application document includes content protected by the copyright. The copyright owner reserves the copyright except copies made for the patent documents or the recorded content of the patent documents in the Patent Office.

What is claimed is:

1. A method comprising:
   detecting an instruction to perform a text-to-speech conversion;
   sending text to a server;
   downloading, from the server, first audio data that are based on the text;
   continuing to download the rest of the first audio data when the first frame is downloaded within a preset duration; and synthesizing, when the first frame is not downloaded within the preset duration, the audio signal into second audio data, wherein the second audio data comprises an audio signal in an offline database and that corresponds to the text.

2. The method of claim 1, wherein the first frame comprises second audio data that is downloaded for a first time and that has a preset length.

3. The method of claim 1, wherein the first frame comprises data that is downloaded for a first time and that comprises at least one complete audio frame.

4. The method of claim 1, further comprising downloading second audio data from the server, wherein the second audio data has a preset length.

5. The method of claim 1, further comprising:
storing the first audio data in a cache; and
playing the first frame when a memory occupation of the first audio data in the cache reaches a threshold.

6. The method of claim 5, further comprising:
transferring the first frame to a parser;
parsing the first frame to obtain decompressed audio data;
transferring the decompressed audio data to a decoder;
decoding the decompressed audio data to obtain second audio data in a preset audio format; and
transferring, to a player for playing, the second audio data.

7. The method of claim 1, wherein the first audio data is in Opus format.

8. A terminal comprising:
a memory configured to store instructions; and
a processor coupled to the memory, wherein the instructions cause the processor to be configured to:
detect an instruction to perform a text-to-speech conversion;
send text to a server;
download, from the server, first audio data based on the text;
continue to download the rest of the first audio data when the first frame is downloaded within a preset duration; and
synthesize, when the first frame is not downloaded within the preset duration, the audio signal into second audio data, wherein the second audio data comprises an audio signal in an offline database and that corresponds to the text.

9. A computer program product comprising computer-executable instructions stored on a non-transitory computer-readable storage medium that, when executed by a processor, cause an apparatus to:
detect an instruction to perform a text-to-speech conversion;
send text to a server;
download, from the server, first audio data based on the text;
continue to download the rest of the first audio data when the first frame is downloaded within a preset duration; and
synthesize, when the first frame is not downloaded within the preset duration, the audio signal into second audio data, wherein the second audio data comprises an audio signal in an offline database and that corresponds to the text.

10. The terminal of claim 8, wherein the first frame comprises second audio data that is downloaded for a first time and that has a preset length.

11. The terminal of claim 8, wherein the first frame comprises data that is downloaded for a first time and that comprises at least one complete audio frame.

12. The terminal of claim 8, wherein the instructions further cause the processor to be configured to download second audio data from the server, and wherein the second audio data has a preset length.

13. The terminal of claim 8, wherein the instructions further cause the processor to be configured to:
store the first audio data in a cache; and
play the first frame when a memory occupation of the first audio data in the cache reaches a threshold.

14. The terminal of claim 13, wherein the instructions further cause the processor to be configured to:
transfer the first frame to a parser;
parse the first frame to obtain decompressed audio data;
transfer the decompressed audio data to a decoder;
decode the decompressed audio data to obtain second audio data in a preset audio format; and
transfer, to a player for playing, the second audio data.

15. The computer program product of claim 9, wherein the constant data length is a preset length.

16. The computer program product of claim 9, wherein the compressed audio data comprises at least one complete audio frame.

17. The computer program product of claim 9, wherein the compressed audio data is in Opus format.

18. The computer program product of claim 9, wherein the instructions further cause the apparatus to:
store the first audio data in a cache; and
play the first frame when a memory occupation of the first audio data in the cache reaches a threshold.

19. The computer program product of claim 18, wherein the instructions further cause the apparatus to:
transfer the first frame to a parser;
parse the first frame to obtain decompressed audio data;
transfer the decompressed audio data to a decoder;
decode the decompressed audio data to obtain second audio data in a preset audio format; and
transfer, to a player for playing, the second audio data.

20. The computer program product of claim 9, wherein the first audio data is in Opus format.

* * * * *